US011818621B2

(12) United States Patent
Ozturk et al.

(10) Patent No.: US 11,818,621 B2
(45) Date of Patent: Nov. 14, 2023

(54) HANDLING OF LISTEN BEFORE TALK FAILURES DURING RADIO RESOURCE CONTROL PROCEDURES

(71) Applicant: QUALCOMM Incorporated, San Diego, CA (US)

(72) Inventors: Ozcan Ozturk, San Diego, CA (US); Xiaoxia Zhang, San Diego, CA (US); Arash Mirbagheri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/226,009

(22) Filed: Apr. 8, 2021

(65) Prior Publication Data

US 2021/0321314 A1    Oct. 14, 2021

Related U.S. Application Data

(60) Provisional application No. 63/007,754, filed on Apr. 9, 2020.

(51) Int. Cl.
*H04W 4/00* (2018.01)
*H04W 36/24* (2009.01)
(Continued)

(52) U.S. Cl.
CPC .......... *H04W 36/24* (2013.01); *H04W 24/04* (2013.01); *H04W 36/0072* (2013.01);
(Continued)

(58) Field of Classification Search
CPC . H04W 36/24; H04W 24/04; H04W 36/0072; H04W 48/10; H04W 74/0816;
(Continued)

(56) References Cited

U.S. PATENT DOCUMENTS 10,979,128 B1 *   4/2021   Babaei ................. H04B 7/0695
2021/0044392 A1 * 2/2021   Myung ................. H04L 1/1864
(Continued)

FOREIGN PATENT DOCUMENTS

WO    WO-2020067667 A1    4/2020

OTHER PUBLICATIONS

International Search Report and Written Opinion—PCT/US2021/026612—ISA/EPO—dated Jul. 27, 2021 (203868WO).
(Continued)

*Primary Examiner* — Chuong T Ho
(74) *Attorney, Agent, or Firm* — Norton Rose Fulbright US LLP

(57) ABSTRACT

Handling of listen before talk (LBT) failures during radio resource control (RRC) procedures is disclosed. A user equipment (UE) may be configured to monitor for consistent uplink and downlink LBT failures on a bandwidth part (BWP) configured for a target cell. When the UE determines that consistent LBT failures are occurring with respect to the BWP, the UE may determine an LBT failure state on the BWP. In response, the UE may execute a recovery procedure, which may include selecting a new BWP associated with the target cell and having configured uplink resources, performing a cell reselection procedure, or switching to idle in order to perform cell selection. The UE may then report the LBT failures according to cell identification and BWP.

30 Claims, 10 Drawing Sheets

(51) Int. Cl.
*H04W 74/08* (2009.01)
*H04W 48/10* (2009.01)
*H04W 36/00* (2009.01)
*H04W 24/04* (2009.01)

(52) U.S. Cl.
CPC ....... *H04W 48/10* (2013.01); *H04W 74/0816* (2013.01); *H04W 74/0833* (2013.01)

(58) Field of Classification Search
CPC ............ H04W 74/0833; H04W 48/12; H04W 36/0079; H04W 36/06; H04W 74/0808; H04W 16/14; H04W 76/27
USPC ......................................................... 370/331
See application file for complete search history.

(56) References Cited

U.S. PATENT DOCUMENTS

| 2021/0144762 | A1* | 5/2021 | Tsai | H04W 72/1284 |
| 2021/0235500 | A1* | 7/2021 | Hong | H04W 76/18 |
| 2022/0078822 | A1* | 3/2022 | Myung | H04W 72/0453 |
| 2022/0078873 | A1* | 3/2022 | Belleschi | H04W 76/19 |
| 2022/0201764 | A1* | 6/2022 | Myung | H04W 74/0808 |
| 2022/0201791 | A1* | 6/2022 | Yao | H04W 76/19 |
| 2022/0369370 | A1* | 11/2022 | Loehr | H04W 74/0808 |

OTHER PUBLICATIONS

Qualcomm Incorporated: "Discussion Regarding NR-U Handover", 3GPP Draft, 3GPP TSG-RAN WG4 RAN4#94, R4-2002132, 3rd Generation Partnership Project (3GPP), Mobile Competence Centre, 650, Route Des Lucioles, F-06921 Sophia-Antipolis Cedex, France, vol. RAN WG4, No. E-meeting, Feb. 24, 2020-Mar. 6, 2020, Feb. 14, 2020 (Feb. 14, 2020), XP051851968, 5 Pages, Retrieved from the Internet: URL: https://ftp.3gpp.org_tsg_ran/WG4_Radio_TSGR4_94_e/Docs/R4-2002132.zip. R4-2002132.docx. [Retrieved on Feb. 14, 2020] Section 2, pp. 2-3, text boxes with sections 5.15 and 5.x.2 and p. 4.

Spreadtrum Communications: "Mobility Consideration in NR-U", 3GPP Draft, 3GPP TSG-RAN WG2 Meeting #107, R2-1909082, 3rd Generation Partnership Project (3GPP), Mobile Competence Centre, 650, Route Des Lucioles, F-06921 Sophia-Antipolis Cedex, France, vol. RAN WG2. No. Prague, Czech Republic, Aug. 26, 2019-Aug. 30, 2019, Aug. 15, 2019 (Aug. 15, 2019), XP051766892, 3 Pages, Retrieved from the Internet: URL: http://www.3gpp.org/ftp/tsg_ran/WG2_RL2/TSGR2_107/Docs/R2-1909082.zip [retrieved on Aug. 15, 2019] the whole document.

* cited by examiner

HANDLING OF LISTEN BEFORE TALK FAILURES DURING RADIO RESOURCE CONTROL PROCEDURES

CROSS-REFERENCE TO RELATED APPLICATIONS

This application claims the benefit of U.S. Provisional Patent Application No. 63/007,754, entitled, "HANDLING OF LISTEN BEFORE TALK FAILURES DURING RADIO RESOURCE CONTROL PROCEDURES," filed on Apr. 9, 2020, which is expressly incorporated by reference herein in its entirety.

BACKGROUND

Field

Aspects of the present disclosure relate generally to wireless communication systems, and more particularly, to handling of listen before talk (LBT) failures during radio resource control (RRC) procedures.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a UE, a handover command over a shared communication spectrum from a source cell to handover to a target cell, determining, by the UE, an LBT failure state on a current bandwidth part (BWP) configured for the target cell, wherein the LBT failure state is determined based on consistent LBT failures detected on the current BWP, and executing, by the UE, a failure recovery procedure in response to the LBT failure state, wherein the failure recovery procedure includes one or more of: completion of the handover and report of the LBT failure state.

In an additional aspect of the disclosure, a method of wireless communication includes identifying, by a UE, a target cell for random access over a shared communication spectrum, initiating, by the UE, a random access procedure on an initial BWP associated with the target cell, determining, by the UE, an LBT failure state on the initial BWP based on consistent LBT failures detected on the initial BWP, and executing, by the UE, a failure recovery procedure in response to the LBT failure state, wherein the failure recovery procedure includes one or more of: completion of the random access procedure and report of the LBT failure state.

In an additional aspect of the disclosure, a method of wireless communication includes identifying, by a UE, a target cell with an inactive connection on a shared communication spectrum, wherein the target cell is identified for a connection resumption, initiating, by the UE, a connection resumption procedure on a BWP associated with the target cell, determining, by the UE, an LBT failure state on the BWP based on consistent LBT failures detected on the BWP, and executing, by the UE, a failure recovery procedure in response to the LBT failure state, wherein the failure recovery procedure includes one or more of: completion of the random access procedure and report of the LBT failure state.

In an additional aspect of the disclosure, a method of wireless communication includes initiating, by a UE, an uplink communication procedure on a shared communication spectrum with a target cell, wherein the uplink communication procedure includes one of a handover command, a random access procedure, or a connection resumption procedure with the target cell, determining, by the UE, a LBT failure state on a BWP associated with the target cell, wherein the LBT failure state is determined based on consistent LBT failure detected on the BWP, and executing, by the UE, a failure recovery procedure in response to the LBT failure state, wherein the failure recovery procedure includes one of completion of the uplink communication procedure or report of the LBT failure state.

In an additional aspect of the disclosure, an apparatus configured for wireless communication includes means for receiving, by a UE, a handover command over a shared communication spectrum from a source cell to handover to a target cell, means for determining, by the UE, an LBT failure state on a current BWP configured for the target cell, wherein the LBT failure state is determined based on consistent LBT failures detected on the current BWP, and means for executing, by the UE, a failure recovery procedure in response to the LBT failure state, wherein the failure recovery procedure includes one or more of: completion of the handover and report of the LBT failure state.

In an additional aspect of the disclosure, an apparatus configured for wireless communication includes means for identifying, by a UE, a target cell for random access over a shared communication spectrum, means for initiating, by the UE, a random access procedure on an initial BWP associated with the target cell, means for determining, by the UE, an LBT failure state on the initial BWP based on consistent LBT failures detected on the initial BWP, and means for executing, by the UE, a failure recovery procedure in response to the LBT failure state, wherein the failure recovery procedure includes one or more of: completion of the random access procedure and report of the LBT failure state.

In an additional aspect of the disclosure, an apparatus configured for wireless communication includes means for identifying, by a UE, a target cell with an inactive connection on a shared communication spectrum, wherein the target cell is identified for a connection resumption, means for initiating, by the UE, a connection resumption procedure on a BWP associated with the target cell, means for determining, by the UE, an LBT failure state on the BWP based on consistent LBT failures detected on the BWP, and means for executing, by the UE, a failure recovery procedure in response to the LBT failure state, wherein the failure recovery procedure includes one or more of: completion of the random access procedure and report of the LBT failure state.

In an additional aspect of the disclosure, an apparatus configured for wireless communication includes means for initiating, by a UE, an uplink communication procedure on a shared communication spectrum with a target cell, wherein the uplink communication procedure includes one of a handover command, a random access procedure, or a connection resumption procedure with the target cell, means for determining, by the UE, a LBT failure state on a BWP associated with the target cell, wherein the LBT failure state is determined based on consistent LBT failure detected on the BWP, and means for executing, by the UE, a failure recovery procedure in response to the LBT failure state, wherein the failure recovery procedure includes one of completion of the uplink communication procedure or report of the LBT failure state.

In an additional aspect of the disclosure, a non-transitory computer-readable medium having program code recorded thereon. The program code further includes code to receive, by a UE, a handover command over a shared communication spectrum from a source cell to handover to a target cell, code to determine, by the UE, an LBT failure state on a current BWP configured for the target cell, wherein the LBT failure state is determined based on consistent LBT failures detected on the current BWP, and code to execute, by the UE, a failure recovery procedure in response to the LBT failure state, wherein the failure recovery procedure includes one or more of: completion of the handover and report of the LBT failure state.

In an additional aspect of the disclosure, a non-transitory computer-readable medium having program code recorded thereon. The program code further includes code to identify, by a UE, a target cell for random access over a shared communication spectrum, code to initiate, by the UE, a random access procedure on an initial BWP associated with the target cell, code to determine, by the UE, an LBT failure state on the initial BWP based on consistent LBT failures detected on the initial BWP, and code to execute, by the UE, a failure recovery procedure in response to the LBT failure state, wherein the failure recovery procedure includes one or more of: completion of the random access procedure and report of the LBT failure state.

In an additional aspect of the disclosure, a non-transitory computer-readable medium having program code recorded thereon. The program code further includes code to identify, by a UE, a target cell with an inactive connection on a shared communication spectrum, wherein the target cell is identified for a connection resumption, code to initiate, by the UE, a connection resumption procedure on a BWP associated with the target cell, code to determine, by the UE, an LBT failure state on the BWP based on consistent LBT failures detected on the BWP, and code to execute, by the UE, a failure recovery procedure in response to the LBT failure state, wherein the failure recovery procedure includes one or more of: completion of the random access procedure and report of the LBT failure state.

In an additional aspect of the disclosure, a non-transitory computer-readable medium having program code recorded thereon. The program code further includes code to initiate, by a UE, an uplink communication procedure on a shared communication spectrum with a target cell, wherein the uplink communication procedure includes one of a handover command, a random access procedure, or a connection resumption procedure with the target cell, code to determine, by the UE, a LBT failure state on a BWP associated with the target cell, wherein the LBT failure state is determined based on consistent LBT failure detected on the BWP, and code to execute, by the UE, a failure recovery procedure in response to the LBT failure state, wherein the failure recovery procedure includes one of completion of the uplink communication procedure or report of the LBT failure state.

In an additional aspect of the disclosure, an apparatus configured for wireless communication is disclosed. The apparatus includes at least one processor, and a memory coupled to the processor. The processor is configured to receive, by a UE, a handover command over a shared communication spectrum from a source cell to handover to a target cell, to determine, by the UE, an LBT failure state on a current BWP configured for the target cell, wherein the LBT failure state is determined based on consistent LBT failures detected on the current BWP, and to execute, by the UE, a failure recovery procedure in response to the LBT failure state, wherein the failure recovery procedure includes one or more of: completion of the handover and report of the LBT failure state.

In an additional aspect of the disclosure, an apparatus configured for wireless communication is disclosed. The apparatus includes at least one processor, and a memory coupled to the processor. The processor is configured to identify, by a UE, a target cell for random access over a shared communication spectrum, to initiate, by the UE, a random access procedure on an initial BWP associated with the target cell, to determine, by the UE, an LBT failure state on the initial BWP based on consistent LBT failures detected on the initial BWP, and to execute, by the UE, a failure recovery procedure in response to the LBT failure state, wherein the failure recovery procedure includes one or more of: completion of the random access procedure and report of the LBT failure state.

In an additional aspect of the disclosure, an apparatus configured for wireless communication is disclosed. The apparatus includes at least one processor, and a memory coupled to the processor. The processor is configured to identify, by a UE, a target cell with an inactive connection on a shared communication spectrum, wherein the target cell is identified for a connection resumption, to initiate, by the UE, a connection resumption procedure on a BWP associated with the target cell, to determine, by the UE, an LBT failure state on the BWP based on consistent LBT failures detected on the BWP, and to execute, by the UE, a failure recovery procedure in response to the LBT failure state, wherein the failure recovery procedure includes one or more of: completion of the random access procedure and report of the LBT failure state.

In an additional aspect of the disclosure, an apparatus configured for wireless communication is disclosed. The apparatus includes at least one processor, and a memory coupled to the processor. The processor is configured to initiate, by a UE, an uplink communication procedure on a shared communication spectrum with a target cell, wherein the uplink communication procedure includes one of a handover command, a random access procedure, or a connection resumption procedure with the target cell, to determine, by the UE, a LBT failure state on a BWP associated with the target cell, wherein the LBT failure state is determined based on consistent LBT failure detected on the BWP, and to execute, by the UE, a failure recovery procedure in response to the LBT failure state, wherein the failure recovery procedure includes one of completion of the uplink communication procedure or report of the LBT failure state.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
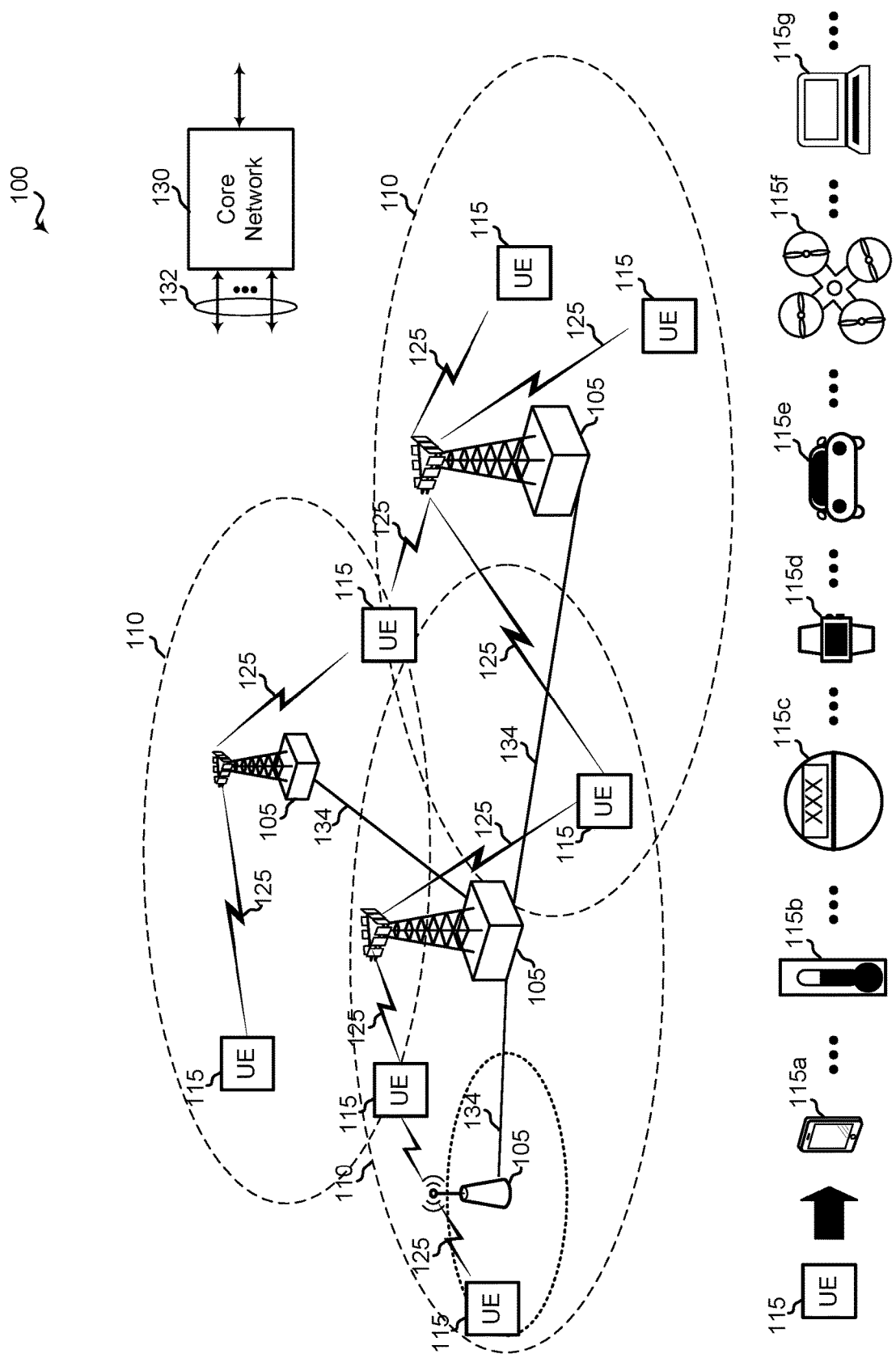
FIG. 1 is a block diagram illustrating details of a wireless communication system.

The detailed description set forth below, in connection with the appended drawings is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports detection and recovery from consistent listen before talk (LBT) failures in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
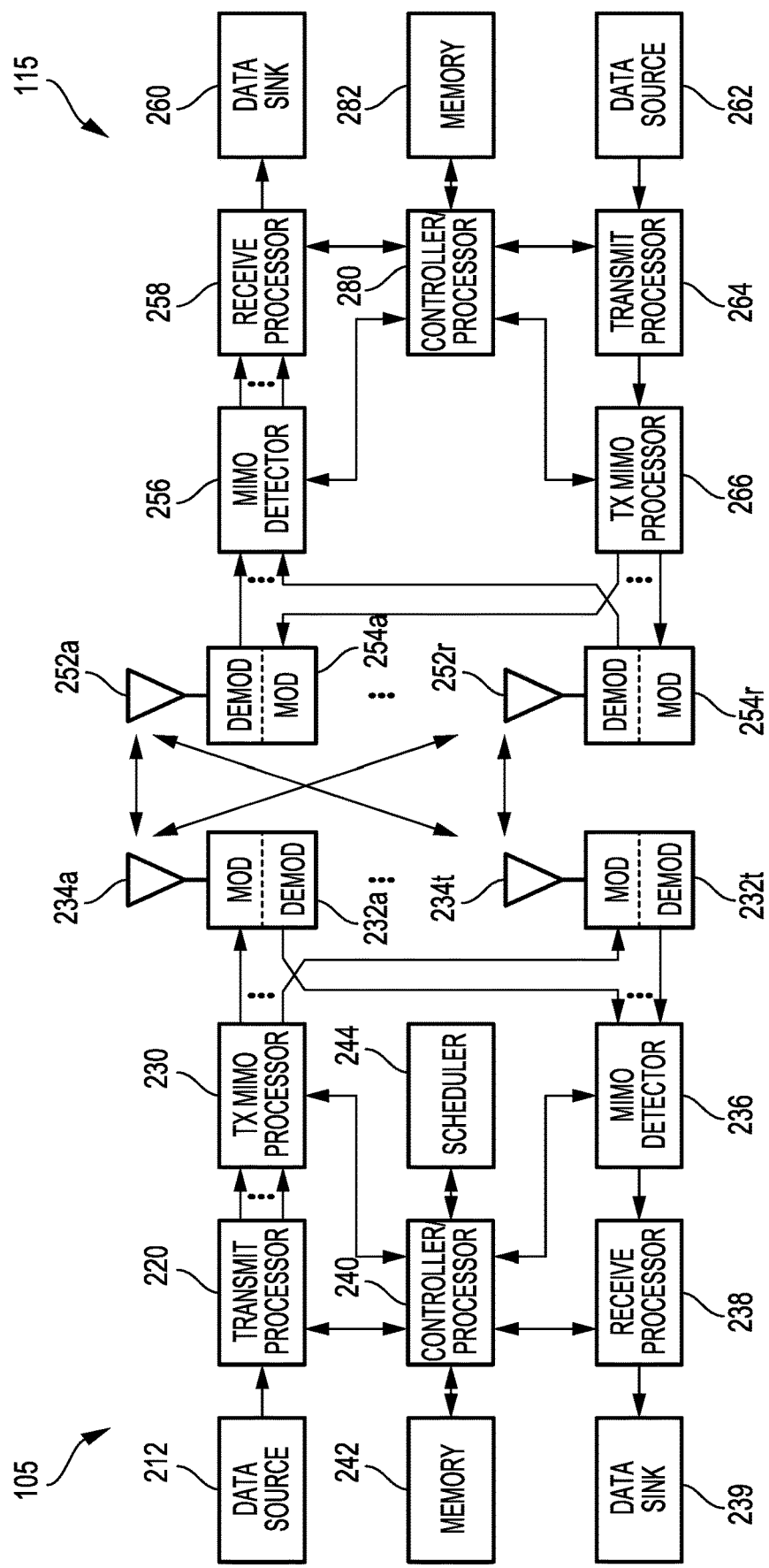
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 3, 5, and 7, and/or other processes for the techniques described herein. The memories 242 and 282 may store data and program codes for the base station 105 and the UE 115, respectively. A scheduler 244 may schedule UEs for data transmission on the downlink and/or uplink.

Envisioned implementations of NR-U networks and operations may provide for the UE to perform listen before talk (LBT) procedures for uplink transmissions in which the UE transmits on the shared communication spectrum after success of the LBT procedure has been detected. The 3GPP community has suggested operations including a detection and recovery mechanism for consistent uplink LBT failures. For dual connectivity deployments, when consistent LBT failures detected on an existing uplink bandwidth part (BWP) associated with a special cell (e.g., a primary cell (PCell) of a primary cell group (PCG) or a primary-secondary cell (PSCell) of a secondary cell group (CSG)), the UE may select another BWP for a recovery procedure. In contrast, where consistent LBT failures are detected on SCells, the UE may report such LBT failure state to the network.

When LBT failures occur consistently on an uplink, it may be beneficial to stop further transmission attempts on the corresponding cell and take further action, such as by changing the cell: Existing NR licensed recovery mechanisms, such as the acknowledgement mode (AM) radio link failure mechanism (RLC AM), include a maximum number of attempts which can be too slow or may not happen at all. A new mechanism to detect and recover from consistent uplink LBT failures has been suggested. Similar to beamforming detection and recovery, the suggested new mechanism detects LBT failure on a per BWP basis and is based on any type of uplink transmission within the BWP. All uplink transmission attempts are treated equally irrespective of physical channel, LBT type, or channel access priority class (CAPC) used. For each such uplink transmission attempt, the physical layer will indicate to the MAC layer whether there was an LBT failure associated with the uplink attempt.

The suggested detection mechanism is proposed to use a timer and a counter. The LBT failure detection timer and failure instance counter may be configured by RRC signaling. The detection timer is configured to re-started with every LBT failure indication, while the counter is incremented with every detected uplink LBT failure and reset when the detection timer expires. When the counter exceeds the predetermined maximum threshold of uplink LBT failures, a compatible UE may determine a consistent level of uplink LBT failures on the current BWP. The various aspects of the present disclosure provide for detection and recovery options when consistent LBT failures of both uplink and downlink LBTs are detected on active BWPs during regular handover operations, initial setup or re-establishment operations, and connection resumption procedures.

Figure 3:
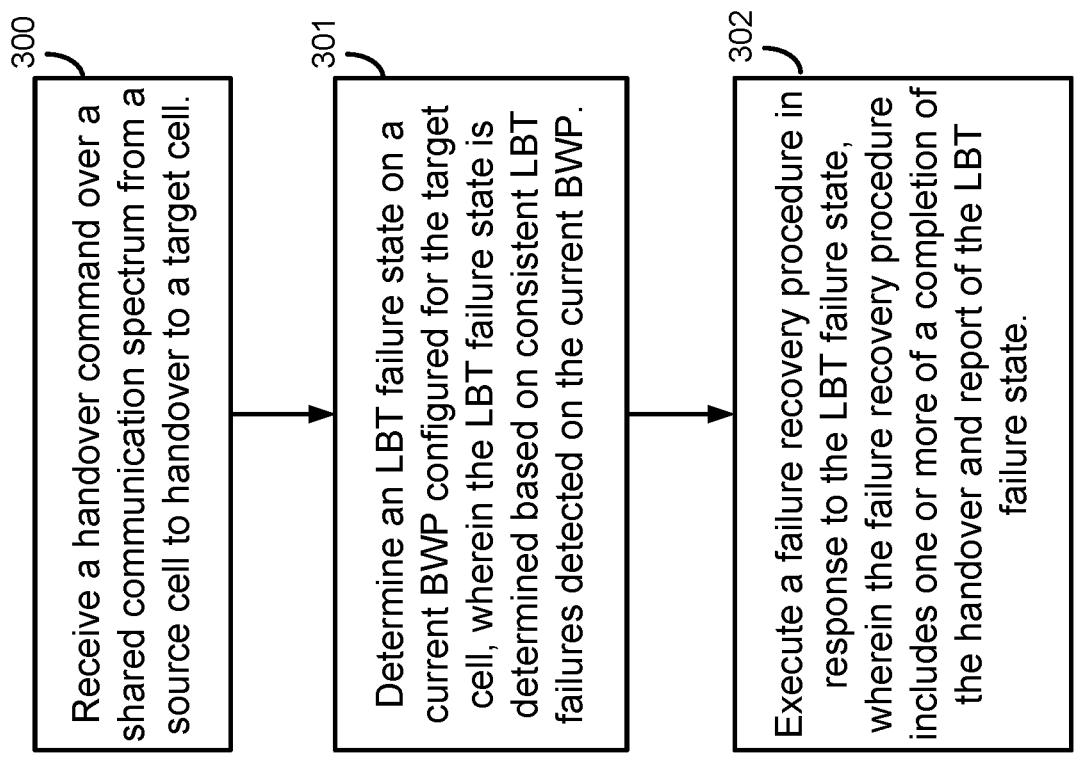
FIG. 3 is a block diagram illustrating example blocks executed to implement one aspect of the present disclosure.
Figure 10:
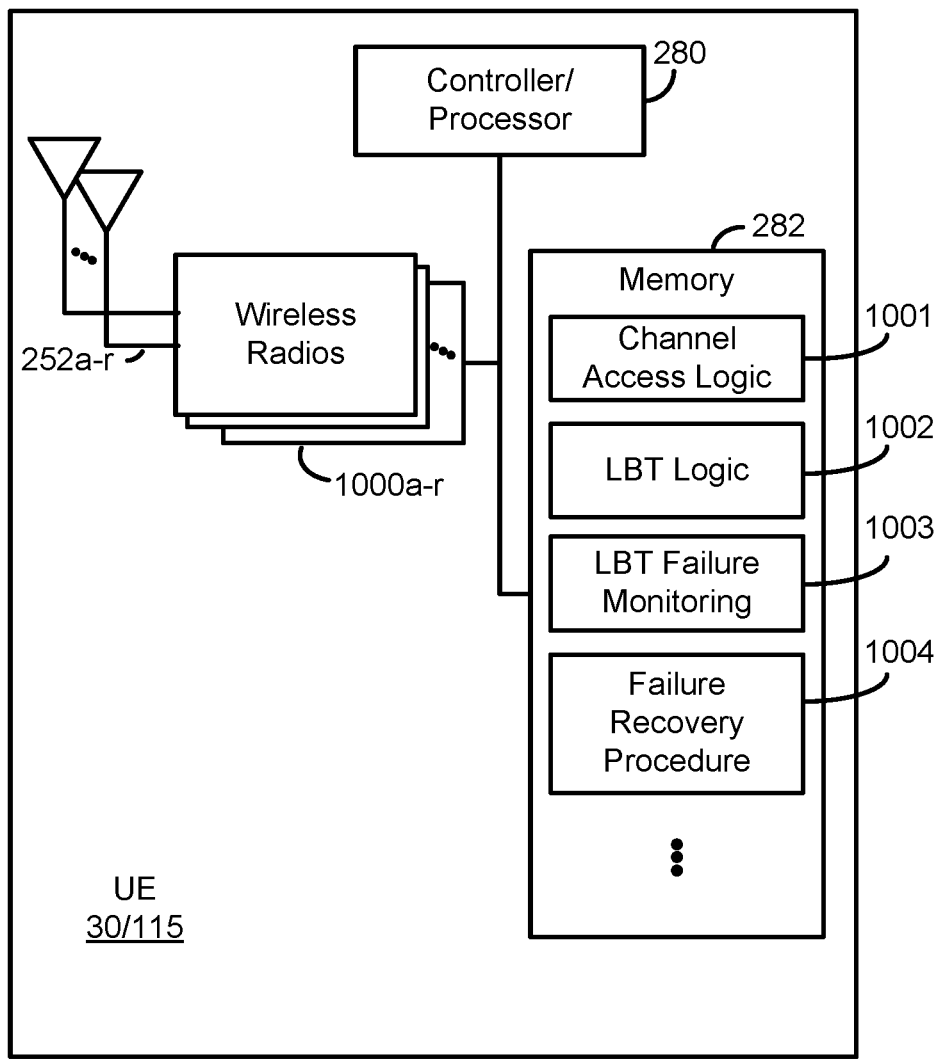
FIG. 10 is a block diagram illustrating a UE configured according to one aspect of the present disclosure.

FIG. 3 is a block diagram illustrating example blocks executed to implement one aspect of the present disclosure. The example blocks will also be described with respect to UE 115 as illustrated in FIGS. 2 and 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000a-r and antennas 252a-r. Wireless radios 1000a-r includes various components and hardware, as illustrated in FIG. 2 for UE 115, including modulator/demodulators 254a-r, MIMO detector 256, receive processor 258, transmit processor 264, and TX MIMO processor 266.

At block 300, a UE receives a handover command over a shared communication spectrum from a source cell to handover to a target cell. A UE, such as UE 30/115, receives a handover command from a source cell via antennas 252a-r and wireless radios 1000a-r. Upon receive of the handover command, UE 30/115, under control of controller/processor 280, executes channel access logic 1001, stored in memory 282. In executing the instructions and code of channel access logic 1001, the features and functionality for various channel access procedures, such as handover, initial setup, re-establishment, resumption, and the like are available to UE 30/115. Such execution of logic instructions to produce the available functionality is referred to as the "execution environment" of such logic.

At block 301, the UE determines an LBT failure state on a current BWP configured for the target cell, wherein the LBT failure state is determined based on consistent LBT failures detected on the current BWP. When beginning the handover procedure within the execution environment of channel access logic 1001, UE 30/115 executes, under control of controller/processor 280, LBT logic 1002, stored in memory 282. The execution environment of LBT logic 1002 provides UE 30/115 with the functionality to conduct various types of LBT procedures for security access to shared communication spectrum for conducting uplink transmissions. Upon detecting LBT failures, UE 30/115, under control of controller/processor 280, executes LBT failure monitoring 1003, stored in memory 282. The execution environment of LBT failure monitoring 1003 provides the functionality to UE 30/115 to monitor both uplink and downlink LBT failures for a consistency of failures. When, within the execution environment of LBT failure monitoring 1003, UE 30/115 observes multiple uplink and downlink LBT failures over a period of time within the current BWP, UE 30/115 will determine an LBT failure state, according to the functionality of LBT failure monitoring 1003.

At block 302, the UE executes a failure recovery procedure in response to the LBT failure state, wherein the failure recovery procedure includes one or more of: completion of the handover and report of the LBT failure state. When UE 30/115 determines the LBT failure state within the execution environment of LBT failure monitoring 1003, UE 30/115, under control of controller/processor 280, executes failure recovery procedure 1004. Within the execution environment of failure recovery procedure 1004, multiple options procedures for recovering from the LBT failure state may be executed. For example, the execution environment of failure recovery procedure 1004 provides for UE 30/115 to select a new BWP configured for the cell and having configured uplink resources and continuing the access type procedure on the new BWP. Alternatively, the execution environment of failure recovery procedure 1004 may provide for UE 30/115 to conduct a cell reselection process to obtain a new BWP, whether universally or within an RNA of UE 30/115. Further, the execution environment of failure recovery procedure 1004 may also provide for UE 30/115 to enter an idle state and perform cell selection. Still further recovery procedures may be available to UE 30/115 under the execution environment of failure recovery procedure 1004.

Figure 4:
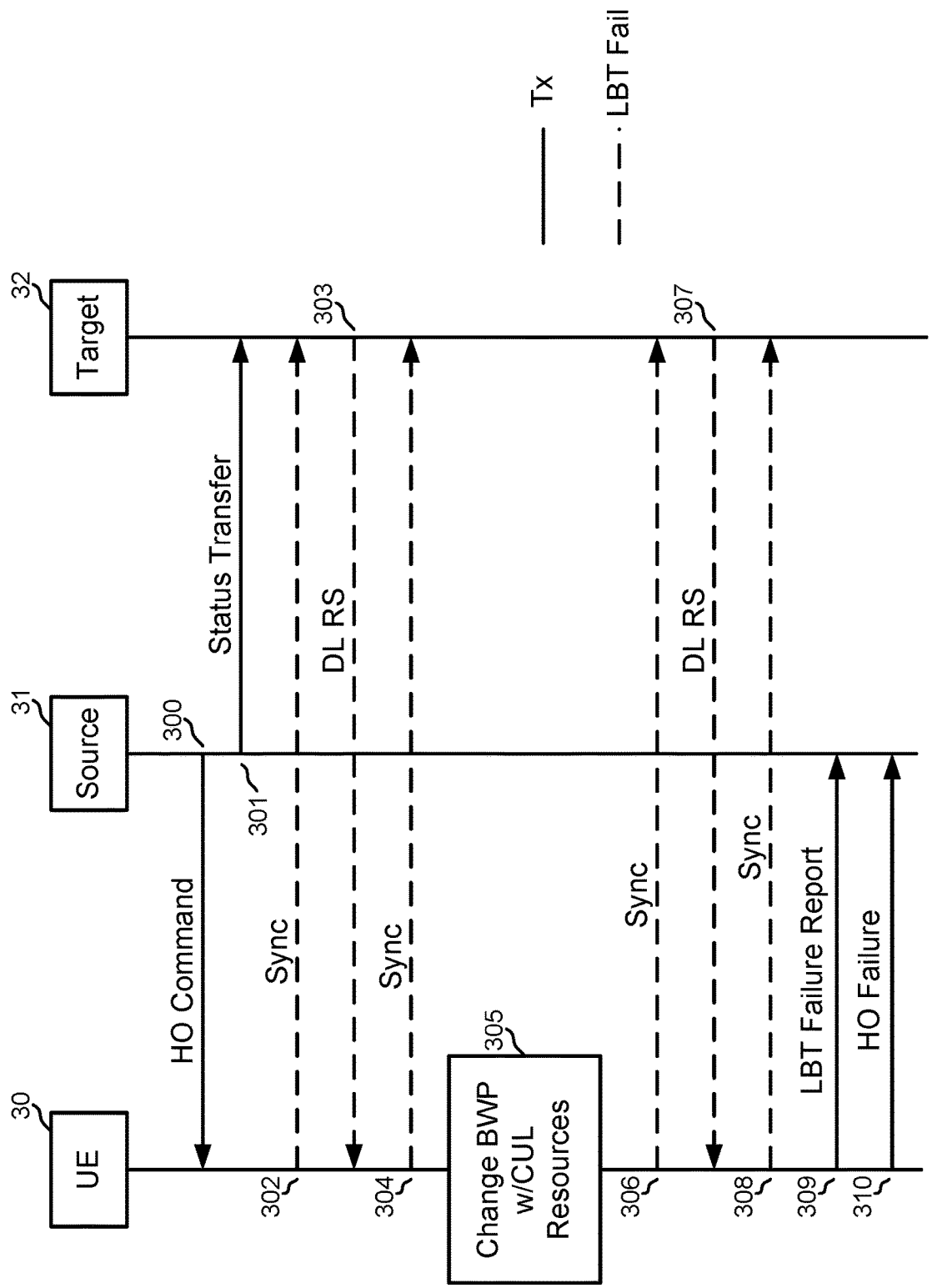
FIG. 4 is a block diagram illustrating a UE configured according to one aspect of the present disclosure for detecting and recovering from consistent LBT failures during a handover procedure.

FIG. 4 is a block diagram illustrating a UE 30 configured according to one aspect of the present disclosure for detecting and recovering from consistent LBT failures during a handover procedure. UE 30 is currently in a connected state with source cell 31. Based at least in part on measurement reports provided by UE 30 (not shown) to source cell 31, source cell 31 may transmit a handover command at 300 to UE 30. In one example implementation, such a handover identified to UE 30 via the handover command at 300 may be implemented according to 3GPP Release-15 (Rel. 15) standards. Upon receipt of the handover command at 300, UE 30 may begin to monitor for consistent LBT failures, whether detected directly by observing failure of an LBT procedure performed by UE 30 to access the shared communication spectrum for any type of uplink transmission or detected implicitly by identifying missing downlink reference signals expected at scheduled or configured times and frequencies from target cell 32.

UE 30 may perform such LBT failure detection on a bandwidth part (BWP) configured for and associated with target cell 32. UE 30 may observe uplink LBT failures based on uplink random access signals or any other UL signals. UE 30 may further implicitly determine downlink LBT failures based on missing downlink reference signals. Such missing downlink reference signals may include synchronization signal blocks (SSBs), channel state information—reference signals (CSI-RS). In order to conduct and observe LBT failures, UE 30 may use LBT parameters available from different locations or operations. In operation, UE 30 maintains various configured parameters for LBT, associations or configurations of BWPs in the system bandwidth of the shared spectrum, and the like in a UE context. Thus, if UE 30 has recently been in a connected state with target cell 32, the UE context may have both BWP information and LBT parameters that can be used to detect LBT failures.

When the UE context does not have the LBT parameters or BWPs associated with target cell 32, UE 30 may use the LBT parameters configured in the handover command at 300 or signaled in a system information broadcast (SIB) message, such as SIB 1. Additionally, if such parameters are not available from the handover command or SIB, UE 30 may have received default LBT detection parameters from the network periodically. In practice, UE 30 may preferably use the LBT parameters in the UE context if available, or else received with the handover command at 300 or any default values. While such parameters would be available in the SIB messages, it may be more efficient for UE 30 to relay on the other methods first.

After transmitting the handover command at 300, source cell 31 will also prepare target cell 32 for the handover via a status transfer message at 301. At 302, UE 30 attempts to transmit a synchronization signal to target cell 32. In preparing for the synchronization signal transmission, UE 30 performs an LBT procedure on the shared communication spectrum. However, UE 30 detects an LBT failure and, thus, cannot transmit the scheduled/configured synchronization signal to target cell 32. In order to monitor the uplink LBT failures, UE 30 may increment an uplink LBT failure counter after detecting the failed LBT procedure at 302. Detection of the LBT failure at 302 also resets an LBT failure detection timer. A consistent nature of LBT failure that would support an LBT failure state includes frequent detection of such LBT failures. The detection timer assists UE 30 in maintaining an indication of the consistency of the LBT failures. UE 30 also implicitly detects a downlink LBT failure of target cell 32 by detecting missing downlink reference signals at 303. According to known parameters and standards the downlink reference signals from target 32 are expected on the shared spectrum at 303. Thus, my not detecting these reference signal, UE 30 can deduce a downlink LBT failure experienced by target cell 32. UE 30 again directly detects an uplink LBT failure at 304 as it intended to secure the shared spectrum for the synchronization signals for target cell 32. UE 30 is attempting to complete handover from source cell 31 to target cell 32. The synchronization signal is one step to completion of the handover that UE 30 cannot obtain if it cannot secure the shared spectrum for uplink transmission. With the detection of the failed LBT at 304, UE 30 determines that it has consistently experienced and detected LBT failures on the BWP configured for access to target cell 32. This determination may be mechanically determined using the uplink LBT failure counter in addition to the implicit observations of failed downlink LBTs through identification of the missing downlink reference signals.

UE 30 declares an LBT failure state for the current BWP at 304. At 305, UE 30 selects a different BWP configured for target cell 32 and part of all of the BWPs making up the system bandwidth of the shared communication spectrum. The new BWP selected also includes configured uplink (CUL) resources, such as configured random access resources or configured uplink data transmission resources. With the continued LBT failure on the additional BWPs having the configured uplink resources, UE 30 determines a failed handover. UE 30 has maintained its connection to source cell 31 because the handover has filed. Accordingly, UE 30 will transmit an LBT failure report at 309 to source cell 31 as well as an indication of handover failure at 310. The LBT failure report at 309 identifies the one or more LBT failures associated with the LBT failure state and identifies the LBT failures according to cell identifier (ID) and BWP corresponding to each LBT failure.

It should be noted that in an alternative aspect, the next BWP selected may either remain the current BWP, when the network or UE 30 is not allowing a switch of BWPs corresponding to target cell 32 or selects either all or a subset of the BWPs associated with target cell 32 that have the configured uplink resources.

Figure 5:
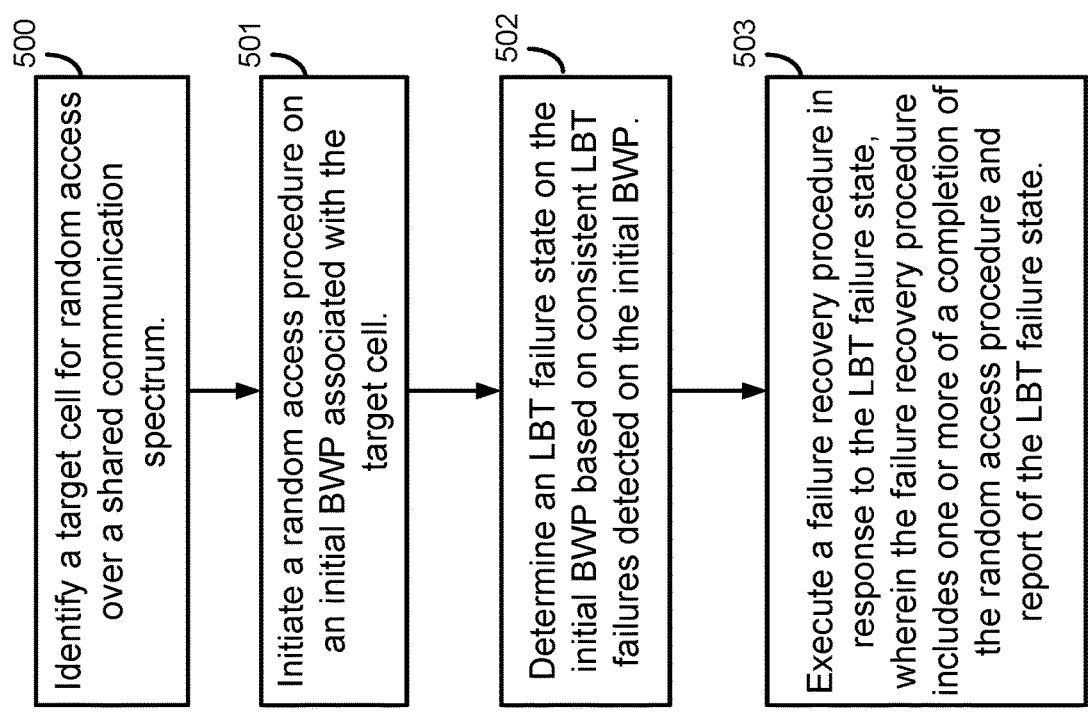
FIG. 5 is a block diagram illustrating example blocks executed to implement one aspect of the present disclosure.

FIG. 5 is a block diagram illustrating example blocks executed to implement one aspect of the present disclosure. The example blocks will also be described with respect to UE 115 as illustrated in FIGS. 2 and 10.

At block 500, a UE identifies a target cell for random access over a shared communication spectrum. A UE, such as UE 30/115, under control of controller/processor 280, executes channel access logic 1001, stored in memory 282. Within the execution environment of channel access logic 1001, UE 30/115 may determine a target cell for access.

At block 501, the UE initiates a random access procedure on an initial bandwidth part (BWP) associated with the target cell. When initiating the random access procedure within the execution environment of channel access logic 1001, UE 30/115 executes, under control of controller/processor 280, LBT logic 1002, stored in memory 282. The execution environment of LBT logic 1002 provides UE 30/115 with the functionality to conduct various types of LBT procedures for random access to shared communication spectrum for conducting uplink transmissions.

At block 502, the UE determines an LBT failure state on the initial BWP based on consistent LBT failures detected on the initial BWP. Within the execution environment of LBT logic 1002, upon detecting LBT failures, UE 30/115, under control of controller/processor 280, executes LBT failure monitoring 1003, stored in memory 282. The execution environment of LBT failure monitoring 1003 provides the functionality to UE 30/115 to monitor both uplink and downlink LBT failures for a consistency of failures. When, within the execution environment of LBT failure monitoring 1003, UE 30/115 observes multiple uplink and downlink LBT failures over a period of time within the current BWP, UE 30/115 will determine an LBT failure state, according to the functionality of LBT failure monitoring 1003.

At block 503, the UE executes a failure recovery procedure in response to the LBT failure state, wherein the failure recovery procedure includes one or more of: completion of the random access procedure and report of the LBT failure state. When UE 30/115 determines the LBT failure state within the execution environment of LBT failure monitoring 1003, UE 30/115, under control of controller/processor 280, executes failure recovery procedure 1004. Within the execution environment of failure recovery procedure 1004, multiple options procedures for recovering from the LBT failure state may be executed. For example, the execution environment of failure recovery procedure 1004 provides for UE 30/115 to select a new BWP configured for the cell and having configured uplink resources and continuing the access type procedure on the new BWP. Alternatively, the execution environment of failure recovery procedure 1004 may provide for UE 30/115 to conduct a cell reselection process to obtain a new BWP, whether universally or within an RNA of UE 30/115. Further, the execution environment of failure recovery procedure 1004 may also provide for UE 30/115 to enter an idle state and perform cell selection. Still further recovery procedures may be available to UE 30/115 under the execution environment of failure recovery procedure 1004.

Figure 6:
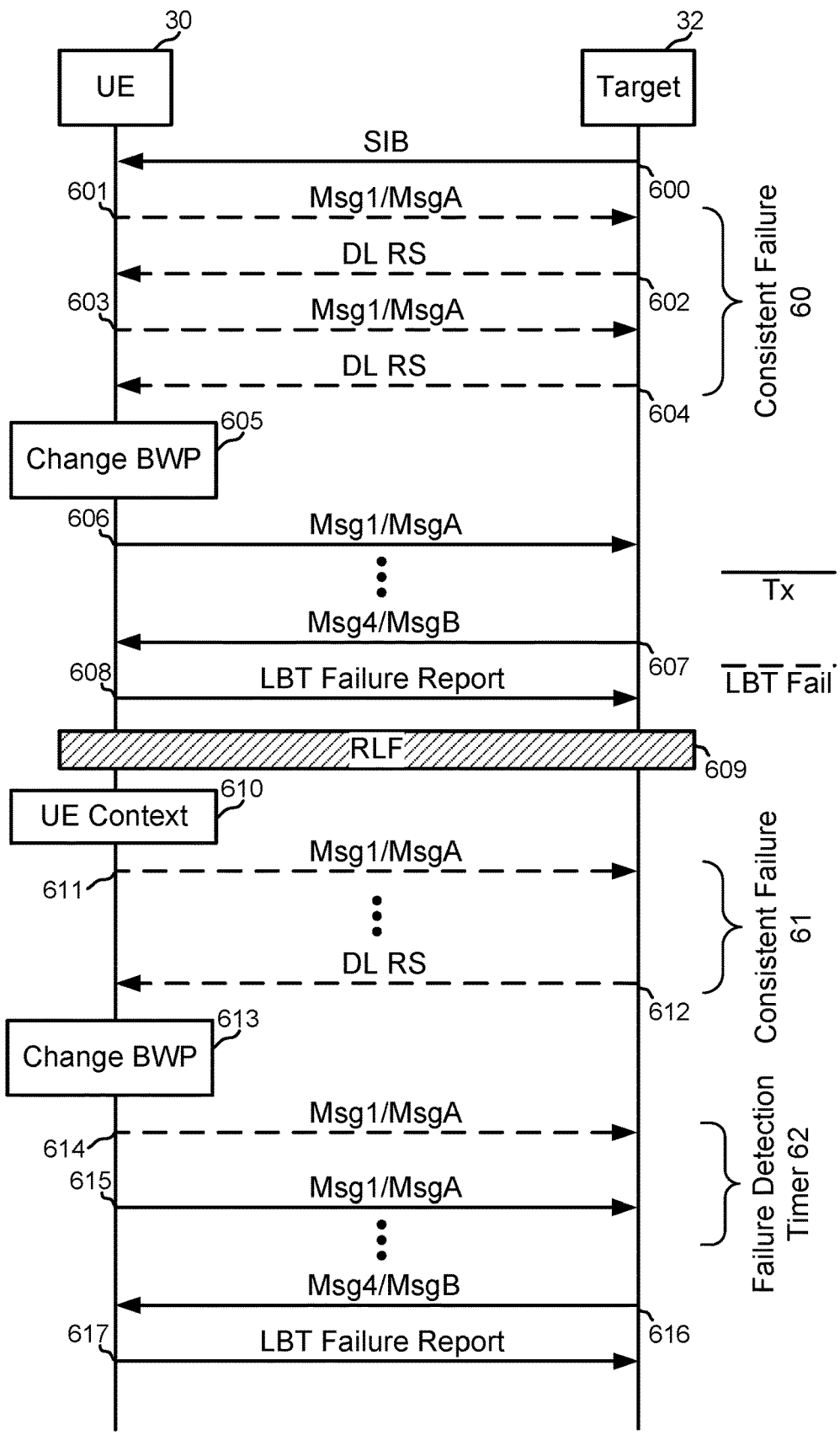
FIG. 6 is a block diagram illustrating a UE configured according to one aspect of the present disclosure for monitoring LBT failure for random access procedures, such initial setup or re-establishment of access.

FIG. 6 is a block diagram illustrating a UE 30 configured according to one aspect of the present disclosure for monitoring LBT failure for random access procedures, such initial setup or re-establishment of access. At 600, UE 30 receives a SIB message from target cell 32 with relevant random access information. Without a recent connection to target cell 32, the SIB message provides UE 30 with indication of the initial BWP configured for target cell 32 as well as the LBT parameters for performing and observing LBT procedures. In order to initiate the random access procedure, UE 30 performs an LBT procedure on the initial BWP configured for target cell 32 to secure the shared communication spectrum for transmission of Msg1 (the random access preamble message) in the 4-step random access procedure or the combined MsgA (essentially combining Msg1 and Msg3 of the 4-step procedure) in the 2-step random access procedure. However, UE 30 detects failure of this LBT procedure. With the detection of this LBT procedure, UE 30 begins monitoring for consistent LBT failures. As experienced by UE 30, UE 30 further implicitly detects a downlink LBT failure with missing downlink reference signals expected at 602, followed by another direct LBT failure by UE 30 for securing the channel to transmit Msg1/MsgA again. With the next implicit detection of a failed downlink LBT via missing downlink reference signals at 604, UE 30 identifies a consistent LBT failure 60 and declares an LBT failure state.

At 605, UE 30 selects a new BWP associated with target cell 32 that also has configured uplink resources. UE 30 begins to initiate the random access procedure on the new BWP. On the new BWP, UE 30 successfully completes the random access procedure between Msg1/MsgA at 606 through Msg4, the contention resolution message, or MsgB, essentially combining Msg2 (random access request) and Msg4, from target cell 32 at 607. With the connection now established between UE 30 and target cell 32 via the new BWP, UE 30 transmits the LBT failure report to target cell 32 at 608. As noted above, the LBT failure report identifies the one or more LBT failures associated with the LBT failure state and identifies these LBT failures according to cell ID and BWP corresponding to each LBT failure.

At 609, the connection between UE 30 and target cell 32 experiences a radio link failure (RLF). The RLF causes UE 30 to switch to an idle state in order to attempt to re-establish the connection with target cell 32. Because UE 30 had been connected already to target cell 32, UE context 610 maintained at UE 30 includes a set of LBT parameters along with a BWP configured for target cell 32. The configured BWP from UE context 610 may be different from the initial BWP that may sometimes be identified in the SIB message previously transmitted at 600 or that may be a part of the default parameters communicated to UE 30 periodically. The configured BWP from UE context 610 may represent the BWP used for the previous connection between UE 30 and target cell 32 before the RLF at 609 and may, therefore, represent the last BWP where UE 30 engaged in a successful connected state with target 32.

In attempting to re-establish network connection, when UE 30 attempts to re-establish connection via target cell 30, it may select the configured BWP within UE context 610 and the other connection parameters, such as the LBT parameters. If UE 30 has moved away from the coverage area of target cell 32, it may instead use the initial BWP for the new cell or the default BWP and connection parameters. For purposes of the illustrated example, UE 30 attempts to re-establish network connection through target cell 32. Accordingly, UE 30 selects the access parameters from UE context 610, including the configured BWP for target cell 32 and corresponding LBT parameters. Before transmitting the initial random access messages (Msg1/MsgA) on the shared spectrum of the configured BWP, UE 30 performs an LBT procedure. At 611, UE 30 detects failure of the LBT procedure.

In monitoring for LBT failures, UE 30 monitors the direct and implicit uplink and downlink LBT failures between 611 and 612, and concludes another period of consistent LBT failure 61. UE 30 would then declare an LBT failure state and select a new BWP configured for target cell 32 and having configured uplink resources, such as random access resources, at 613. UE 30 attempt to complete the random access connection re-establishment with transmission of Msg1/MsgA. However, at 614, UE 30 again detects failure of the uplink LBT procedure for the new BWP. The detected failure would trigger UE 30 to increment the uplink LBT failure counter and reset failure detection timer 62 At the next configured random access resource, UE 30 against prepares for transmitting the initial message of the random access process (Msg1/MsgA).

At 615, UE 30 detects success of the LBT procedure and transmits Msg1/MsgA to initiate the random access procedure. UE 30 and target 32 successfully complete the random access procedure between Msg1/MsgA at 615 and Msg4/MsgB at 616, thus, re-establishing the connection between UE 30 and target cell 32. Once the connection is re-established, UE 30 performs another successful LBT procedure and transmits the LBT failure report at 617. As noted above, the LBT failure report identifies the LBT failures according to cell ID and BWP corresponding to each LBT failure. However, according to the described example aspect, the failure report transmitted at 617 would not include identification of the uplink LBT failure at 614 because no additional LBT failure was detected within failure detection timer 62. When the uplink LBT failure is detected at 614, UE 30 increments the uplink LBT failure counter. However, as failure detection timer 62 expires without detection of any additional LBT failures, UE 30 would reset the counter. The LBT failure report would include the LBT failures associated with each increment of the LBT failure counter. Therefore, the LBT failure report transmitted by UE 30 at 617 would reflect the LBT failures that triggered the LBT failure state at 612 which led to UE 30 selecting the new BWP at 613.

Figure 7:
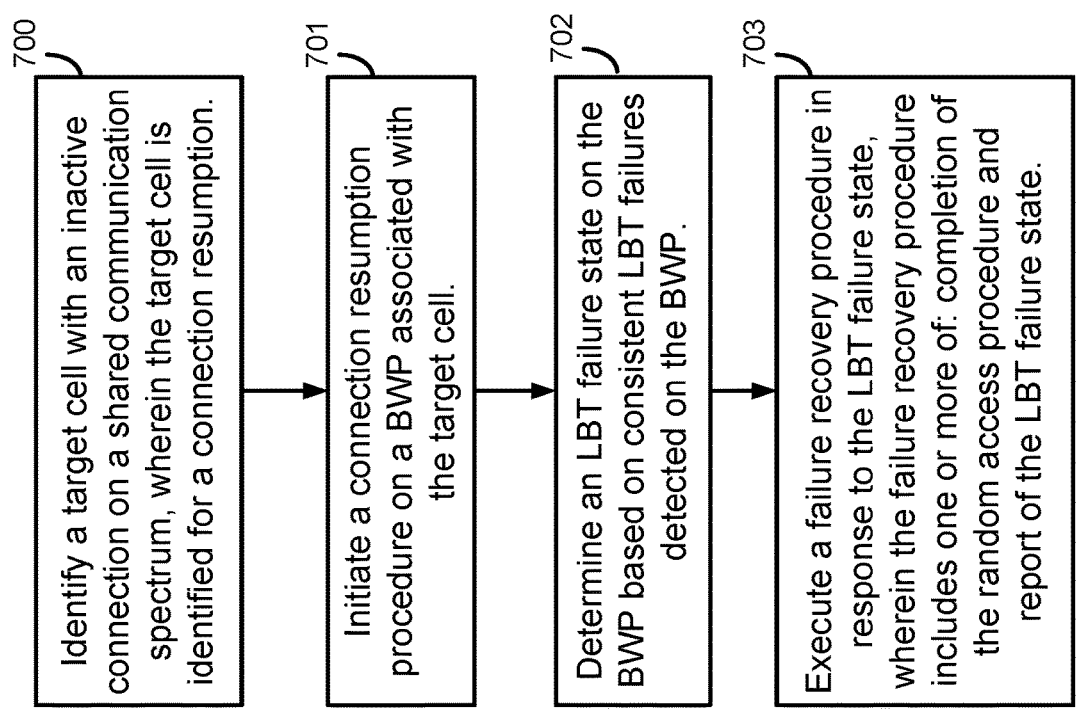
FIG. 7 is a block diagram illustrating example blocks executed to implement one aspect of the present disclosure.

FIG. 7 is a block diagram illustrating example blocks executed to implement one aspect of the present disclosure. The example blocks will also be described with respect to UE 115 as illustrated in FIGS. 2 and 10.

At block 700, a UE identifies a target cell with an inactive connection on a shared communication spectrum, wherein the target cell is identified for a connection resumption. A UE, such as UE 30/115, under control of controller/processor 280, executes channel access logic 1001, stored in memory 282. Within the execution environment of channel access logic 1001, UE 30/115 may determine an inactive target cell for resumption of connection.

At block 701, initiates a connection resumption procedure on a bandwidth part (BWP) associated with the target cell. When initiating the random access procedure within the execution environment of channel access logic 1001, UE 30/115 executes, under control of controller/processor 280, LBT logic 1002, stored in memory 282. The execution environment of LBT logic 1002 provides UE 30/115 with the functionality to conduct various types of LBT procedures for connection resumption to shared communication spectrum for conducting uplink transmissions.

At block 702, determines an LBT failure state on the BWP based on consistent LBT failures detected on the BWP. Within the execution environment of LBT logic 1002, upon detecting LBT failures on the current BWP, UE 30/115, under control of controller/processor 280, executes LBT failure monitoring 1003, stored in memory 282. The execution environment of LBT failure monitoring 1003 provides the functionality to UE 30/115 to monitor both uplink and downlink LBT failures for a consistency of failures. When, within the execution environment of LBT failure monitoring 1003, UE 30/115 observes multiple uplink and downlink LBT failures over a period of time within the current BWP, UE 30/115 will determine an LBT failure state, according to the functionality of LBT failure monitoring 1003.

At block 703, executes a failure recovery procedure in response to the LBT failure state, wherein the failure recovery procedure includes one or more of: completion of the random access procedure and report of the LBT failure state. When UE 30/115 determines the LBT failure state within the execution environment of LBT failure monitoring 1003, UE 30/115, under control of controller/processor 280, executes failure recovery procedure 1004. Within the execution environment of failure recovery procedure 1004, multiple options procedures for recovering from the LBT failure state may be executed. For example, the execution environment of failure recovery procedure 1004 provides for UE 30/115 to select a new BWP configured for the cell and having configured uplink resources and continuing the access type procedure on the new BWP. Alternatively, the execution environment of failure recovery procedure 1004 may provide for UE 30/115 to conduct a cell reselection process to obtain a new BWP, whether universally or within an RNA of UE 30/115. Further, the execution environment of failure recovery procedure 1004 may also provide for UE 30/115 to enter an idle state and perform cell selection. Still further recovery procedures may be available to UE 30/115 under the execution environment of failure recovery procedure 1004.

Figure 8:
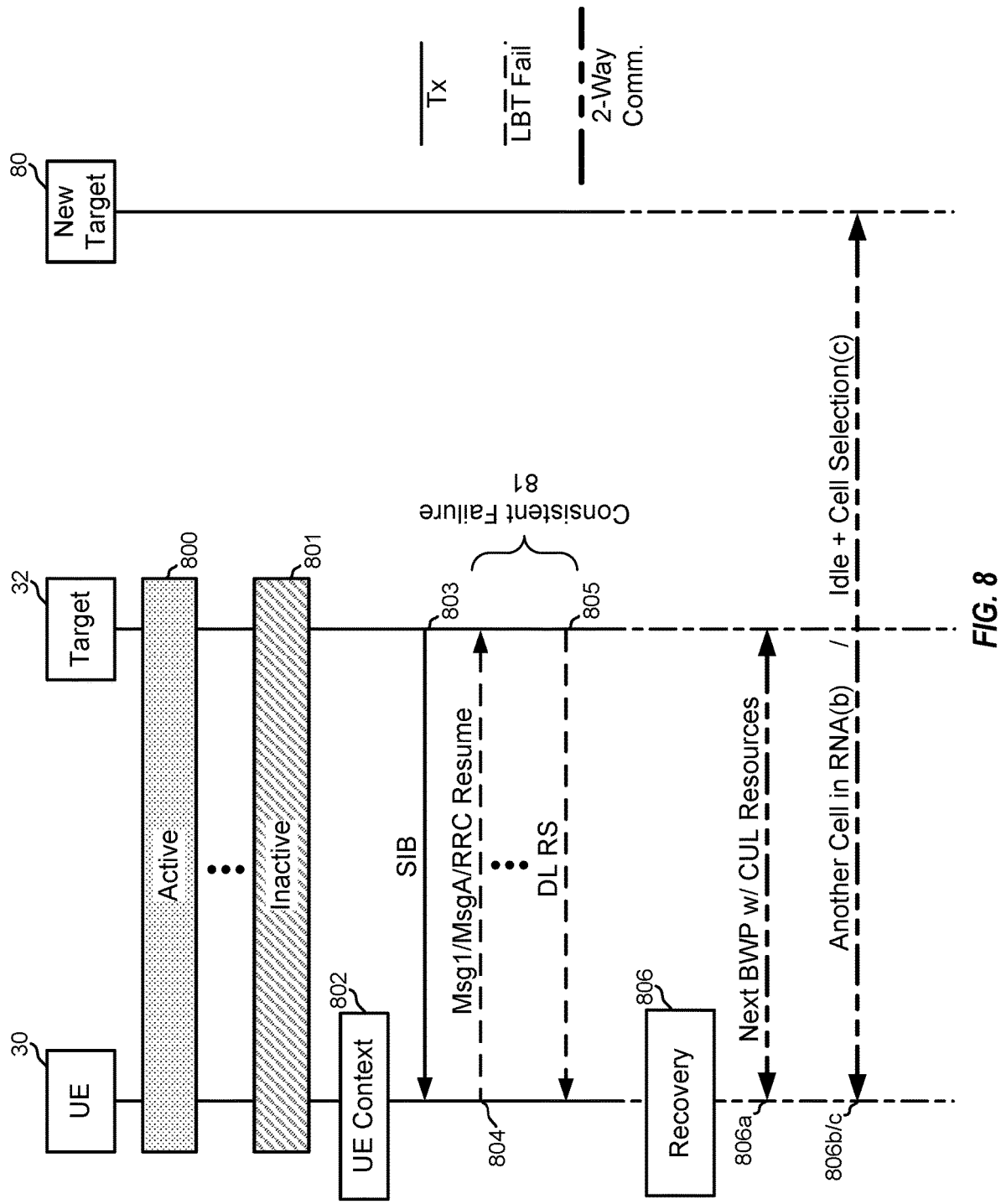
FIG. 8 is a block diagram illustrating a UE configured according to one aspect of the present disclosure for monitoring LBT failure for a connection resumption procedure.

FIG. 8 is a block diagram illustrating a UE 30 configured according to one aspect of the present disclosure for monitoring LBT failure for a connection resumption procedure. UE 30 establishes an active connection 800 with target cell 32. UE 30 and target cell 32 conduct communications via active connection 800. At 801, UE 30 becomes inactive and remains inactive throughout inactive state 801. When UE 30 determines to resume the connection after inactive state 801, UE 30 would initiate a connection resumption procedure, such as through RRC signaling, to resume its connection to the network. UE 30 selects the resumption parameters from UE context 802. As noted above, UE context 802 includes the set of parameters, including the configured BWP and LBT parameters used by UE 30 during active state 800. At 803, target 32 transmits SIB, which UE 30 receives and reads any additional parameters. If the parameters are unavailable from UE context 802, UE 30 may select the parameters in the SIB or the default parameters in memory at UE 30.

Using the selected BWP associated with target cell 32 and the LBT parameters, UE 30 monitors for direct uplink LBT failures based on uplink random access transmissions or any other uplink transmission attempted and/or implicit downlink LBT failure based on missing expected downlink reference signals. After receiving the SIB message at 803, UE 30 begins the connection resumption procedure, such as through transmitting a random access message (e.g., Msg1/MsgA) or an RRC signal for resuming activity (e.g., RRC Resume). However, after performing the LBT procedure to secure access to the shared communication spectrum over the configured BWP, UE 30 detects the uplink LBT failure at 804. UE 30 may increment the uplink LBT failure counter and begin the failure detection timer. UE 30 detects enough uplink and downlink LBT failures between 804 and 805 to determine a consistent LBT failure 81. UE 30 declares an LBT failure state once consistent LBT failure 81 is determined. The failure state triggers UE 30 to initiate recovery procedure 806.

According to the previously illustrated and described aspects herein, the recovery procedure has included the UE, such as UE 30, selecting a new BWP having configured uplink resources. Once selected, that UE would attempt to conclude the underlying process (e.g., handover, initial setup/re-establishment, etc.) over the new BWP for the target cell. However, the various aspects of the present disclosure are not limited to a single recovery procedure. According to the aspect illustrated in FIG. 8, recovery procedure 806 may include selecting a new BWP having configured uplink resources, as described in previous aspects. In such option aspect, UE 30 selects the new BWP having the configured uplink resources and attempts to complete the connection resumption procedure via two-way communications 806a with target cell 32.

In another optional example aspect, recovery procedure 806 may include UE 30 performing cell reselection to a different cell, such as new target cell 80. In this optional example aspect, new target cell 80 is identified in the radio access network (RAN)-based notification area (RNA), which includes a list of cells, nodes, or base stations around the last known location of UE 30. The RNA concept in NR/NR-U operations is similar to the tracking area (TA) concept in LTE networks. According to the optional example aspect, UE 30 selects new target cell 80 from the list of cells, gNBs, and base stations in the RNA. UE 30 may continue the connection resumption procedure via two-way communications 806b in a BWP configured for new target cell 80.

In a third optional example aspect, recovery procedure 806 may include UE 30 switching to an idle state and performing cell selection to select and identify a new cell. For purposes of this third optional example aspect, UE 30 performs cell selection and selects new target cell 80 to initiate a new connection. UE 30 may then establish the new connection via two-way communications 806c in the BWP configured for new target cell 80.

In any of the optional example aspects for recovery procedure 806, UE 30 may successfully resume connection with the network, whether through target cell 32 or new target cell 80. Once the connection is resumed, UE 30 may transmit the LBT failure report to the connected cell, target cell 32 or target cell 80. Alternatively, if UE 30 is unable to successfully resume the connection through the connection resumption process, UE 30 can declare a radio link failure to attempt a new connection via the cell selection process. The new connection established with new target cell 80 would then provide UE 30 with a network connection to transmit the LBT failure report.

In the various aspects illustrated and described with respect FIGS. 3-8, UE 30 obtains or selects a BWP and LBT parameters to attempt access and monitor LBT failures. It should be noted that, in the various aspects of the present disclosures, the BWP and LBT parameter configurations may be different depending on the type of access being attempted by UE 30. For example, the LBT parameters may be different for handover, connection resumption, re-establishment, or setup.

The various aspects of the present disclosure as illustrated and described with respect to FIGS. 3-8 have described access operations in general and that might be covered in 3GPP Rel. 15 operations. However, the various aspect of the present disclosure may also apply to more advanced NR operations, such as the dual connectivity operations in NR and NR-U networks.

Figure 9:
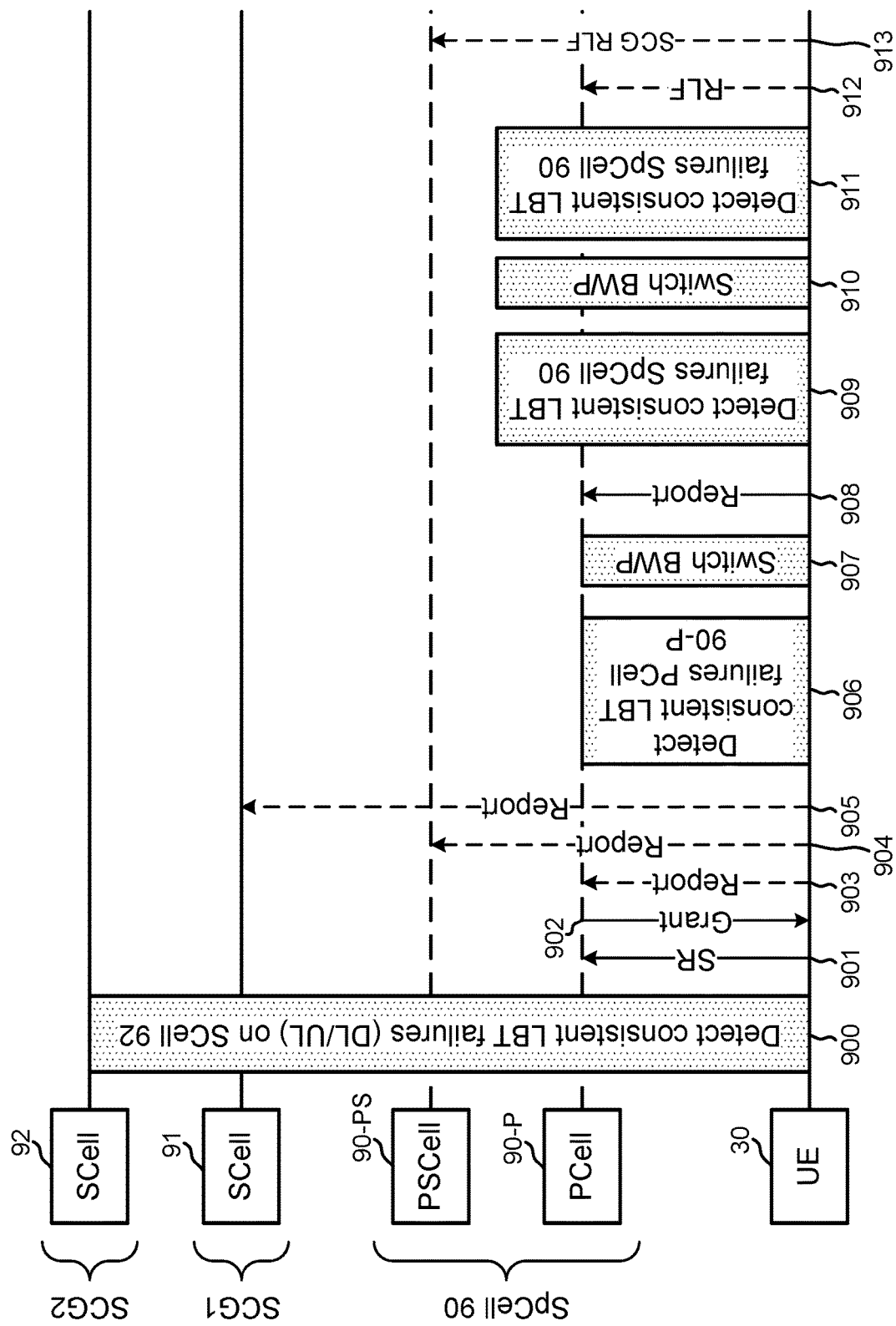
FIG. 9 is a block diagram illustrating a UE configured according to aspects of the present disclosure to monitor LBT failures within dual connectivity operations of an NR-U network.

FIG. 9 is a block diagram illustrating a UE 30 configured according to aspects of the present disclosure to monitor LBT failures within dual connectivity operations of an NR-U network. Communications with UE 30 is provided with dual connectivity connections between a special cell (SpCell) 90 of the master cell group (MCG), including either or both of a primary cell (PCell) 90-P of a primary cell group (PCG) and a primary-secondary cell (PSCell) 90-PS of a secondary cell group (SCG), which is an operationally primary cell that is within an unlicensed secondary cell group. UE 30 is also provided connections via a first secondary cell group (CSG1) with SCell 91 and a second CSG (CSG2) with SCell 92.

At 900, UE 30 detects consistent LBT failures of both uplink and downlink LBT procedures over the BWP configured for SCell 92. When consistent uplink LBT failures are detected on an SCell(s), such as SCell 92, UE 30 reports this to a corresponding node (e.g., a master node (MN) for the MCG, a secondary node (SN) for the SCG) via a medium access control—control element (MAC CE): The LBT failure report may be sent on a different serving cell than where the failures were detected, SCell 92. For example, after detecting the consistent LBT failures at 900, UE 30 prepares the LBT failure report in a MAC CE. Where PSCell 90-PS and/or SCell 91 are the corresponding nodes, UE 30 would transmit the LBT failure report is transmitted to PSCell 90-PS at 904 and/or to SCell 91 at 905. However, where no resources are available to transmit the LBT failure report, UE 30 may transmit a scheduling request (SR) at 901 to PCell 90-P, when PCell 90-P is the corresponding node. PCell 90-P responds at 902 with an uplink grant and allocated uplink resources. In response, UE 30 then transmits the LBT failure report MAC CE at 903.

At 906, UE 30 detects consistent LBT failures on SpCell 90, such as on the BWP configured for PCell 90-P. In response to the determination of consistent LBT failures, UE 30 switches to another uplink BWP with configured uplink resources for PCell 90-P and initiates the random access procedure. Upon successfully establishing the connection with PCell 90-P over the new BWP, UE 30 transmits the LBT failure report via the MAC CE at 908. It should be noted that when multiple BWPs are available with configured uplink resources, UE 30 may select the desired BWP based on the UE implementation.

At 909, UE 30 detects consistent LBT failures on SpCell 90, which may affect either or both of PCell 90-P and PSCell 90-PS. UE 30 determines an LBT failure state and selects a new BWP with configured uplink resources at 910. UE 30, at 911, continues to detect consistent LBT failures on all the available BWPs with configured uplink resources. In response, to the continued LBT failures detected at 911, UE 30 would declare a link failure and report the link failure on the master node. For example, on PCell 90-P, UE 30 would declare a radio link failure (RLF) and report the RLF to PCell 90-P at 912. Similarly, on PSCell 90-PS, UE 30 would declare a SCG RLF and report the SCG failure to PSCell 90-PS at 912.

In the various operational implementations of the aspects of the present disclosure, the MAC CE used for the LBT failure report may be assigned a higher access priority than data, but a lower priority than the MAC CE beamforming recovery procedures. In selected implementations of the various aspects, the MAC CE for the LBT failure report may include a bitmap that indicates whether the corresponding serving cell has declared an LBT failure state determined when consistent uplink and downlink LBT failures have been detected.

As indicated with regard to FIG. 9, when consistent LBT failures are detected at 906 on PCell 90-P, the failure report may be sent on the BWP that UE 30 switched to at 907. Additionally, when reporting the SCG failure information at 913, a new failure type for PSCell 90-PS may be used that reflects the determination of consistent LBT failure. In contrast, no new re-establishment cause would be needed in an RRC re-establishment message. Simple reference to an "other" failure will suffice.

It should further be noted that when UE 30 requests resources for transmitting the LBT failure report at 901, an SR configuration (SR ID) may be configured for such SRs triggered by the consistent LBT failures detected on SCell 92, which can be then shared with other logical channels. A random access procedure may be triggered when this SR configuration ID is not configured.

It should be further noted that UE 30 may cease any ongoing random access procedure and initiate a new random access procedure after selecting a new BWP triggered by detection of consistent LBT failures on SpCell 90. Moreover, UE 30 may cancel all LBT failures triggered for a SCell, such as SCell 92 upon deactivation of SCell 92. In operation, when UE 30 transmits the LBT failure report at one of 903-905, the network may respond to the failure report by deactivating SCell 92. Similarly, UE 30 may cancel any detected LBT failures, if any, upon a MAC reset affecting the corresponding serving cell.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3, 5, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication includes receiving, by a UE, a handover command over a shared communication spectrum from a source cell to handover to a target cell; determining, by the UE, an LBT failure state on a current BWP configured for the target cell, wherein the LBT failure state is determined based on consistent LBT failures detected on the current BWP; and executing, by the UE, a failure recovery procedure in response to the LBT failure state, wherein the failure recovery procedure includes one or more of: completion of the handover and report of the LBT failure state.

A second aspect, based on the first aspect, wherein the executing the failure recover procedure includes selecting, by the UE, in response to the LBT failure state, a next one or more BWPs of a system bandwidth of the shared communication spectrum having configured uplink resources to complete the handover to the target cell; and signaling, by the UE, a handover failure to the source cell in response to determination of the LBT failure state for each of the next one or more BWPs having the configured uplink resources.

A third aspect, based on the second aspect, wherein the configured uplink resources include one or more of: configured random access resources; and configured uplink data transmission resources.

A fourth aspect, based on the second aspect, further including transmitting, by the UE, an LBT failure report to a selected cell, wherein the LBT failure report includes identification of one or more LBT failures associated with the LBT failure state.

A fifth aspect, based on the fourth aspect, wherein the LBT failure report identifies the one or more LBT failures according to cell ID and BWP corresponding to each of the one or more LBT failures.

A sixth aspect, based on the second aspect, wherein the target cell includes a special cell of a dual connectivity operation.

A seventh aspect, based on the sixth aspect, further including detecting, by the UE, failure of the handover; and declaring, by the UE, a link failure of the special cell, wherein the link failure includes one of a secondary cell group radio link failure when the special cell includes a primary secondary cell; or a radio link failure when the special cell includes a primary cell.

An eighth aspect, based on the seventh aspect, further including transmitting, by the UE, indication of the secondary cell group radio link failure to a master node of the primary cell in response to declaration of the secondary cell group radio link failure.

A ninth aspect, based on the first aspect, further including determining, by the UE, a resource is available for transmission from the UE to a node of a serving cell; and reporting, by the UE, indication of the LBT failure state to the node on the resource, wherein the serving cell is different than the target cell, and wherein the node includes one of: a master node when the serving cell is a primary cell, or a secondary node when the serving cell is a secondary cell.

A tenth aspect, based on the ninth aspect, further including determining, by the UE, the resource is not available for transmission to the node; transmitting a scheduling request for a scheduled resource available for transmission from the UE to the node of the serving cell, wherein the reporting the indication of the LBT failure state occurs using the scheduled resource.

An eleventh aspect, based on the first aspect, wherein each of the uplink LBT failures is detected for each unsuccessful LBT procedure conducted by the UE for an uplink transmission, and wherein each of the downlink LBT failures is detected for each downlink reference signal identified as missing from a scheduled location.

A twelfth aspect, based on the eleventh aspect, further including obtaining, by the UE, a set of LBT parameters for detection of the uplink and downlink LBT failures via one of the receiving the handover command; or identifying the set of LBT parameters in a current UE context; or retrieving a set of default LBT parameters for the set of LBT parameters.

A thirteenth aspect, based on the first aspect, wherein the selecting the next one or more BWPs includes one of selecting the current BWP as the next one or more BWPs; or selecting the next one or more BWPs, wherein the next one or more BWPs include all BWPs of the system bandwidth having configured random access resources; or selecting the network one or more BWPs, wherein the next one or more BWPs include a subset of BWPs of the system bandwidth having configured random access resources.

A fourteenth aspect including any combination of the first through thirteenth aspects.

A fifteenth aspect for wireless communications includes identifying, by a UE, a target cell for random access over a shared communication spectrum; initiating, by the UE, a random access procedure on an initial BWP associated with the target cell; determining, by the UE, an LBT failure state on the initial BWP based on consistent LBT failures detected on the initial BWP; and executing, by the UE, a failure recovery procedure in response to the LBT failure state, wherein the failure recovery procedure includes one or more of: completion of the random access procedure and report of the LBT failure state.

A sixteenth aspect, based on the fifteenth aspect, wherein the executing the failure recover procedure includes selecting, by the UE, in response to the LBT failure state, a next one or more BWPs of a system bandwidth of the shared communication spectrum having configured random access resources to complete the random access procedure with the target cell; and initiating, by the UE, a cell reselection process in response to determination of the LBT failure state for each of the next one or more BWPs having the configured random access resources.

A seventeenth aspect, based on the sixteenth aspect, further including completing, by the UE, the cell reselection process with connection to a reselected cell; transmitting, by the UE, an LBT failure report to the reselected cell, wherein the LBT failure report includes identification of one or more LBT failures associated with the LBT failure state.

An eighteenth aspect, based on the seventeenth aspect, wherein the LBT failure report identifies the one or more LBT failures according to cell ID and BWP corresponding to each of the one or more LBT failures.

A nineteenth aspect, based on the sixteenth aspect, wherein the target cell includes a special cell of a dual connectivity operation.

A twentieth aspect, based on the nineteenth aspect, further including detecting, by the UE, failure of the cell reselection process; and declaring, by the UE, a link failure of the special cell, wherein the link failure includes one of a secondary cell group radio link failure when the special cell includes a primary secondary cell; or a radio link failure when the special cell includes a primary cell.

A twenty-first aspect, based on the twentieth aspect, further including transmitting, by the UE, indication of the secondary cell group radio link failure to a master node of the primary cell in response to declaration of the secondary cell group radio link failure.

A twenty-second aspect, based on the twenty-first aspect, further including determining, by the UE, a resource is available for transmission from the UE to a node of a serving cell; and reporting, by the UE, indication of the LBT failure state to the node on the resource, wherein the serving cell is different than the target cell, and wherein the node includes one of: a master node when the serving cell is a primary cell, or a secondary node when the serving cell is a secondary cell.

A twenty-third aspect, based on the twenty-second aspect, further including determining, by the UE, the resource is not available for transmission to the node; transmitting a scheduling request for a scheduled resource available for transmission from the UE to the node of the serving cell, wherein the reporting the indication of the LBT failure state occurs using the scheduled resource.

A twenty-fourth aspect, based on the fifteenth aspect, wherein the identifying the target cell for random access includes one of identifying the target cell for connection re-establishment; or identifying the target cell for initial access.

A twenty-fifth aspect, based on the twenty-fourth aspect, further including obtaining, by the UE, a set of LBT parameters for detection of the uplink and downlink LBT failures via one of identifying the set of LBT parameters in a current UE context; or receiving the set of LBT parameters in a system information broadcast; or retrieving a set of default LBT parameters for the set of LBT parameters; or retrieving the set of LBT parameters configured for the UE during a previous connection with the target cell prior to the connection re-establishment.

A twenty-sixth aspect, based on the fifteenth aspect, wherein each of the uplink LBT failures is detected for each unsuccessful LBT procedure conducted by the UE for one or more of an uplink random access message and an uplink transmission, and wherein each of the downlink LBT failures is detected for each downlink reference signal identified as missing from a scheduled location.

A twenty-seventh aspect includes any combination of the fifteenth through twenty-sixth aspects.

A twenty-eighth aspect of wireless communication includes identifying, by a UE, a target cell with an inactive connection on a shared communication spectrum, wherein the target cell is identified for a connection resumption; initiating, by the UE, a connection resumption procedure on a BWP associated with the target cell; determining, by the UE, an LBT failure state on the BWP based on consistent LBT failures detected on the BWP; and executing, by the UE, a failure recovery procedure in response to the LBT failure state, wherein the failure recovery procedure includes one or more of: completion of the random access procedure and report of the LBT failure state.

A twenty-ninth aspect, based on the twenty-eighth aspect, wherein the executing the failure recover procedure includes determining, by the UE, in response to the LBT failure state, a continued connection resumption procedure, wherein the continued connection resumption procedure includes one of selecting, within a UE context, a next one or more BWPs of a system bandwidth of the shared communication spectrum having configured uplink resources to complete the continued connection resumption procedure with the target cell; or identifying a new target cell in a RNA to complete the continued connection resumption procedure; or performing a cell reselection process to complete the continued connection resumption procedure, wherein the cell reselection process is performed after the UE switches to an idle state.

A thirtieth aspect, based on the twenty-ninth aspect, wherein the configured uplink resources include one or more of configured random access resources; and configured uplink data transmission resources.

A thirty-first aspect, based on the thirtieth aspect, further including completing, by the UE, the continued connection resumption process with connection to a another target cell; transmitting, by the UE, an LBT failure report to the another target cell, wherein the LBT failure report includes identification of one or more LBT failures associated with the LBT failure state.

A thirty-second aspect, based on the thirty-first aspect, wherein the LBT failure report identifies the one or more LBT failures according to cell ID and BWP corresponding to each of the one or more LBT failures.

A thirty-third aspect, based on the twenty-ninth aspect, wherein the target cell includes a special cell of a dual connectivity operation.

A thirty-fourth aspect, based on the thirty-second aspect, further including detecting, by the UE, failure of the continued connection resumption procedure; and declaring, by the UE, a link failure of the special cell, wherein the link failure includes one of a secondary cell group radio link failure when the special cell includes a primary secondary cell; or a radio link failure when the special cell includes a primary cell.

A thirty-fifth aspect, based on the thirty-fourth aspect, further including transmitting, by the UE, indication of the secondary cell group radio link failure to a master node of the primary cell in response to declaration of the secondary cell group radio link failure.

A thirty-sixth aspect, based on the twenty-eighth aspect, further including determining, by the UE, a resource is available for transmission from the UE to a node of a serving cell; and reporting, by the UE, indication of the LBT failure state to the node on the resource, wherein the serving cell is different than the target cell, and wherein the node includes one of: a master node when the serving cell is a primary cell, or a secondary node when the serving cell is a secondary cell.

A thirty-seventh aspect, based on the thirty-sixth aspect, further including determining, by the UE, the resource is not available for transmission to the node; transmitting a scheduling request for a scheduled resource available for transmission from the UE to the node of the serving cell, wherein the reporting the indication of the LBT failure state occurs using the scheduled resource.

A thirty-eighth aspect, based on the twentieth aspect, wherein the selecting the next one or more BWPs and the identifying the new target cell are further within the resumption timer period.

A thirty-ninth aspect, based on the twenty-eighth aspect, wherein the BWP associated with the target cell is obtained from one of a UE context; or an initial BWP received by the UE in a prior system information broadcast message.

A fortieth aspect, based on the twenty-eighth aspect, further including obtaining, by the UE, a set of LBT parameters for detection of the uplink and downlink LBT failures via one of identifying the set of LBT parameters in a UE context; or receiving the set of LBT parameters in a system information broadcast; or retrieving a set of default LBT parameters for the set of LBT parameters.

A forty-first aspect, based on the twenty-eighth aspect, wherein each of the uplink LBT failures is detected for each unsuccessful LBT procedure conducted by the UE for an uplink transmission, and wherein each of the downlink LBT failures is detected for each downlink reference signal identified as missing from a scheduled location.

A forty-second aspect including any combination of the twenty-eighth aspect through the forty-first aspect.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
 initiating, by a user equipment (UE), an uplink communication procedure on a shared communication spectrum with a cell;
 determining, by the UE, a listen before talk (LBT) failure state on a bandwidth part (BWP) associated with the cell, wherein the LBT failure state is determined based on consistent LBT failure detected on the BWP; and
 executing, by the UE, a failure recovery procedure in response to the LBT failure state, wherein the failure recovery procedure includes completion of the uplink communication procedure, wherein the uplink communication procedure includes a connection resumption procedure.

2. The method of claim 1,
wherein the initiating the uplink communication procedure includes receiving a handover command over the shared communication spectrum from a source cell to handover to the cell, wherein the uplink communication procedure includes the handover,
wherein the determining the LBT failure state includes determining the LBT failure state on a current BWP configured for the cell based on the consistent LBT failures detected on the current BWP, and
wherein the failure recovery procedure includes one or more of: the completion of the handover and report of the LBT failure state.

3. The method of claim 2, wherein the executing the failure recovery procedure includes:
selecting, by the UE, in response to the LBT failure state, a next one or more BWPs of a system bandwidth of the shared communication spectrum having configured uplink resources to complete the handover to the cell; and
signaling, by the UE, a handover failure to the source cell in response to determination of the LBT failure state for each of the next one or more BWPs having the configured uplink resources.

4. The method of claim 3, wherein the configured uplink resources include one or more of:
configured random access resources; and
configured uplink data transmission resources.

5. The method of claim 3, further including:
transmitting, by the UE, an LBT failure report to a selected cell, wherein the LBT failure report includes identification of one or more LBT failures associated with the LBT failure state.

6. The method of claim 5, wherein the LBT failure report identifies the one or more LBT failures according to cell identifier (ID) and BWP corresponding to each of the one or more LBT failures.

7. The method of claim 2, further comprising selecting the next one or more BWPs, wherein the selecting the next one or more BWPs includes one of:
selecting the current BWP as the next one or more BWPs; or
selecting the next one or more BWPs, wherein the next one or more BWPs include all BWPs of a system bandwidth having configured random access resources; or
selecting the next one or more BWPs, wherein the next one or more BWPs include a subset of BWPs of the system bandwidth having configured random access resources.

8. The method of claim 1,
wherein the initiating the uplink communication procedure includes:
identifying the cell for random access over the shared communication spectrum; and
initiating a random access procedure on an initial BWP associated with the cell, wherein the uplink communication procedure includes the random access procedure;
wherein the determining the LBT failure state includes determining the LBT failure state on the initial BWP based on the consistent LBT failures detected on the initial BWP, and wherein the failure recovery procedure includes one or more of: completion of the random access procedure and a report of the LBT failure state.

9. The method of claim 8, wherein the executing the failure recovery procedure includes:
selecting, in response to the LBT failure state, a next one or more BWPs of a system bandwidth of the shared communication spectrum having configured random access resources to complete the random access procedure with the cell; and
initiating a cell reselection process in response to determination of the LBT failure state for each of the next one or more BWPs having the configured random access resources.

10. The method of claim 9, further including:
completing, by the UE, the cell reselection process with connection to a reselected cell;
transmitting, by the UE, an LBT failure report to the reselected cell, wherein the LBT failure report includes identification of one or more LBT failures associated with the LBT failure state.

11. The method of claim 10, wherein the LBT failure report identifies the one or more LBT failures according to cell identifier (ID) and BWP corresponding to each of the one or more LBT failures.

12. The method of claim 8, wherein the identifying the cell for random access includes one of:
identifying the cell for connection re-establishment; or
identifying the cell for initial access.

13. The method of claim 12, further including:
obtaining, by the UE, a set of LBT parameters for detection of the uplink and downlink LBT failures via one of:
identifying the set of LBT parameters in a current UE context; or
receiving the set of LBT parameters in a system information broadcast; or
retrieving a set of default LBT parameters for the set of LBT parameters; or
retrieving the set of LBT parameters configured for the UE during a previous connection with the cell prior to the connection re-establishment.

14. The method of claim 8,
wherein each uplink LBT failure of the consistent LBT failures is detected for each unsuccessful LBT procedure conducted by the UE for one or more of an uplink random access message and an uplink transmission, and
wherein each downlink LBT failure of the consistent LBT failures is detected for each downlink reference signal identified as missing from a scheduled location.

15. The method of claim 1,
wherein the initiating the uplink communication procedure includes:
identifying the cell with an inactive connection on the shared communication spectrum, wherein the cell is identified for a connection resumption;
initiating a connection resumption procedure on the BWP associated with the cell, wherein the uplink communication procedure includes the connection resumption procedure; and
wherein the failure recovery procedure includes one or more of: completion of a random access procedure and report of the LBT failure state.

16. The method of claim 15, wherein the executing the failure recovery procedure includes:

determining, by the UE, in response to the LBT failure state, a continued connection resumption procedure, wherein the continued connection resumption procedure includes one of:
  selecting, within a UE context, a next one or more BWPs of a system bandwidth of the shared communication spectrum having configured uplink resources to complete the continued connection resumption procedure with the cell; or
  identifying a new cell in a radio access network (RAN)-based notification area (RNA) to complete the continued connection resumption procedure; or
  performing a cell reselection process to complete the continued connection resumption procedure, wherein the cell reselection process is performed after the UE switches to an idle state.

17. The method of claim 16, wherein the configured uplink resources include one or more of:
  configured random access resources; and
  configured uplink data transmission resources.

18. The method of claim 17, further including:
  completing, by the UE, the continued connection resumption process with connection to a another cell;
  transmitting, by the UE, an LBT failure report to the another cell, wherein the LBT failure report includes identification of one or more LBT failures associated with the LBT failure state.

19. The method of claim 18, wherein the LBT failure report identifies the one or more LBT failures according to cell identifier (ID) and BWP corresponding to each of the one or more LBT failures.

20. The method of claim 15, further comprising selecting the next one or more BWPs, wherein the selecting the next one or more BWPs and the identifying the cell are further within a resumption timer period.

21. The method of claim 15, wherein the BWP associated with the cell is obtained from one of:
  a UE context; or
  an initial BWP received by the UE in a prior system information broadcast message.

22. The method of claim 15, further including:
  obtaining, by the UE, a set of LBT parameters for detection of the uplink and downlink LBT failures via one of:
    identifying the set of LBT parameters in a UE context; or
    receiving the set of LBT parameters in a system information broadcast; or
    retrieving a set of default LBT parameters for the set of LBT parameters.

23. The method of claim 15,
wherein each uplink LBT failure of the consistent LBT failures is detected for each unsuccessful LBT procedure conducted by the UE for an uplink transmission, and
wherein each downlink LBT failure of the consistent LBT failures is detected for each downlink reference signal identified as missing from a scheduled location.

24. The method of claim 1, wherein the cell includes a special cell of a dual connectivity operation.

25. The method of claim 24, further including:
  detecting, by the UE, failure of the uplink communication procedure; and
  declaring, by the UE, a link failure of the special cell, wherein the link failure includes one of:
    a secondary cell group radio link failure when the special cell includes a primary secondary cell; or
    a radio link failure when the special cell includes a primary cell.

26. The method of claim 25, further including:
  transmitting, by the UE, indication of the secondary cell group radio link failure to a master node of the primary cell in response to declaration of the secondary cell group radio link failure.

27. The method of claim 1, further including:
  determining, by the UE, a resource is available for transmission from the UE to a node of a serving cell; and
  reporting, by the UE, indication of the LBT failure state to the node on the resource, wherein the serving cell is different than the cell, and wherein the node includes one of: a master node when the serving cell is a primary cell, or a secondary node when the serving cell is a secondary cell.

28. The method of claim 27, further including:
  determining, by the UE, the resource is not available for transmission to the node;
  transmitting a scheduling request for a scheduled resource available for transmission from the UE to the node of the serving cell, wherein the reporting the indication of the LBT failure state occurs using the scheduled resource.

29. An apparatus for wireless communication, the apparatus comprising:
  at least one processor; and
  a memory coupled to the at least one processor, wherein the at least one processor is configured to:
    initiate, by a user equipment (UE), an uplink communication procedure on a shared communication spectrum with a cell;
    determine, by the UE, a listen before talk (LBT) failure state on a bandwidth part (BWP) associated with the cell, wherein the LBT failure state is determined based on consistent LBT failure detected on the BWP; and
    execute, by the UE, a failure recovery procedure in response to the LBT failure state,
  wherein the failure recovery procedure includes completion of the uplink communication procedure, wherein the uplink communication procedure includes a connection resumption procedure.

30. The apparatus of claim 29, wherein the at least one processor configured to determine the LBT failure state comprises the at least one processor further configured to:
  determine the LBT failure state on a current BWP configured for the cell based on the consistent LBT failures detected on the current BWP.

* * * * *